United States Patent [19]

Ukisu

[11] Patent Number: 4,690,645
[45] Date of Patent: Sep. 1, 1987

[54] INTERACTIVE EDUCATIONAL DEVICE
[75] Inventor: Hiroshi Ukisu, Matsudo, Japan
[73] Assignee: Epoch Company, Ltd., Tokyo, Japan
[21] Appl. No.: 771,410
[22] Filed: Aug. 30, 1985
[51] Int. Cl.⁴ .............................................. G09B 7/06
[52] U.S. Cl. .................................... 434/309; 434/319; 434/321; 434/335
[58] Field of Search ............... 434/319, 321, 308, 309, 434/335

[56] References Cited
U.S. PATENT DOCUMENTS 4,321,633  3/1982  Saito ..................................... 434/319
4,372,554  2/1983  Orenstein ............................ 434/321
4,464,124  8/1984  Romero et al. ..................... 434/321

FOREIGN PATENT DOCUMENTS

1400279  7/1972  United Kingdom .
1281732  7/1972  United Kingdom .
1295446  11/1972  United Kingdom .

Primary Examiner—Leo P. Picard
Attorney, Agent, or Firm—Staas & Halsey

[57] ABSTRACT

An educational device is adapted to receive a programmed tape cassette having voice signals and data signals stored thereon. The programmed tape cassette is organized so that the voice signals include questions as well as other entertaining subject matter, while the data signals include answers to the corresponding questions. The voice signals and data signals are read from the tape cassette and a playback circuit provides a voice playback signal to a speaker, while providing a data playback signal to a microcomputer. The microcomputer is also connected to a keyboard and a display, as well as being connected to drive the tape cassette. In operation, the tape cassette is driven and an audio question is produced by the speaker. At the same time, the correct answer data is stored by the microcomputer. After the audio question has been generated, the tape cassette is stopped and a user is allowed to input answer data via the keyboard. The microcomputer compares the input answer data with the correct answer data and causes the display to generate a correct answer display or an incorrect answer display in dependence upon this comparison. If the user inputs an incorrect answer twice in a row, then the microcomputer causes the display to automatically display the correct answer. In addition to the program mode of operation, the educational device also has a mode in which standard type cassettes can be played by the educational device.

12 Claims, 13 Drawing Figures

INTERACTIVE EDUCATIONAL DEVICE

BACKGROUND OF THE INVENTION

The present invention is directed to an interactive educational device and particularly to an interactive educational device which is adapted to receive programmed tape casettes storing questions and data representing the answers to the questions, and which allows a user to input answer data in response to an audio signal including a question.

Prior art educational devices for children have generally consisted of pre-progammed devices which include only a limited number of questions and answers, thereby limiting their educational value. Other more expensive prior art educational devices have included microcomputers which can be programmed for different educational purposes through the use of disks, cartridges, etc. While these more expensive educational devices can be tailored to specific needs, the expense of purchasing the specialized disks, cartridges, etc. usually makes them unattractive as an educational device for a child. This is particularly true in view of the fact that many of these devices and programs are not sufficiently entertaining for a child, so that they do not hold the child's interest. Thus, there is a need in the art for a relatively low cost user interactive educational device which is capable of being programmed for a variety of educational purposes and levels and which is capable of providing sufficient entertainment to hold a child's interest.

SUMMARY OF THE INVENTION

It is an object of the present invention to provide a relatively inexpensive user interactive educational device which can be programmed for various educational exercises using programs stored on standard tape cassettes.

It is a further object of the invention to provide an educational device which reads a question and corresponding answer from a tape cassette and which generates an audio signal, including a question, to which the user is to supply responsive answer data.

It is a still further object of the present invention to provide an educational device which provides automatic feedback to the user as to the correctness of the answer data input by the user, and to automatically display the correct answer after the user has input a predetermined number of incorrect answers.

The educational device of the present invention has a program mode in which it is adapted to receive a standard tape cassette having voice signals and data signals stored thereon. A tape driving means drives the tape cassette and a reading means, including magnetic heads and playback circuitry, reads the stored voice signals and data signals from the tape cassette and generates a voice playback signal and a data playback signal representing a question and the corresponding answer to the question. The educational device further includes a speaker which acts as a means for generating an audio signal based on the voice playback signal, and a keyboard which functions as user input means for inputting answer data in response to the question. A display means displays the answer data input by the user and, as well, generates a first display signal or a second display signal depending on the correctness of the user's answer. Control means, in the form of a microcomputer, controls the operation of the tape driving means and the display means in dependence upon the data playback signal read from the tape cassette and the answer data input by the user. The microcomputer compares the answer data input by the user with the correct answer data in the data playback signal read from the tape cassette, and generates a control signal to cause the display means to generate the first or second display signal depending upon whether the answer data is correct. In the preferred embodiment, after the user has input two incorrect answers, the microcomputer will automatically cause the display means to display the correct answer.

In addition to the program mode of the educational device of the present invention, the device of the present invention also has a music mode, and the preferred embodiment also includes at least one internal game mode. The provision of the music mode of operation allows the user to listen to standard tape cassettes (e.g., music or other audio subject matter) using the educational device of the present invention. For example, the educational device of the present invention is capable of playing a standard tape cassette of the type which is played in automobile cassette players, when in the music mode. When in the internal game mode, the educational device of the present invention is capable of playing a user interactive game which, for example, requires the user to press certain buttons in a particular sequence or to press certain buttons within a specified time period to score points.

In an alternate embodiment of the present invention, a simplified version of the educational device of the present invention is provided, which includes only the music mode and the program mode. Further, in the simplified embodiment, the display is capable of displaying only the display signals for indicating whether an answer is correct or incorrect. That is, in this simplified version, the display does not display the answer data as it is input by the user. Nor does the simplified embodiment of the present invention provide the correct answer after a predetermined number of incorrect numbers have been input by the user.

The educational device of the present invention provides a number of advantages as set forth below. The educational device of the present invention combines a computer style keyboard, a liquid crystal display and a standard cassette player which is capable of playing both programmed tape cassettes and standard tape cassettes. By providing a device which is capable of using standard tape cassettes, the educational device of the present invention is made easily operable by a child, or even a parent. The educational device of the present invention provides immediate answer feedback to the user since, as the child presses letters or numbers on the keyboard, the characters appear on the display. This allows the user to check his or her response to a question. Further, when an answer is completed, a display signal indicating that the answer is correct or that the user should try again, as well as a corresponding electronic melody, are generated to indicate to the user whether or not the answer is correct.

The provision of programmed tape cassettes allows a large degree of flexibility and makes the educational device of the present invention attractive to users over a wide age range. For example, certain programmed cassettes can be targeted to preschoolers and young learners to introduce them to the alphabet, letters, rhyming words, numbers, spelling, math, fantasy and facts. As the child gets older, these programs can be advanced in order to stimulate the child to reach new levels of learning. Further, because the programmed tape cassettes used by the educational device of the present invention are capable of generating all types of audio signals, the programmed cassettes can include not only audio questions but also audio portions including sound effects, characters, music, etc. for describing fanciful stories which can be used to maintain the child's interest. For example, educational questions can be couched in terms of a story or dialogue between two characters to make them more interesting to the child. Thus, the balance between questions and story telling and dialogue can be varied in dependence upon the age of the child for which the programmed tape cassette is targeted.

In summary, the educational device of the present invention provides a flexible yet inexpensive device for both entertaining and educating a user. Further, since much greater flexibility is provided by allowing the educational device to operate solely in an entertainment mode by playing a standard tape cassette, this allows a user to make more use of the educational device than is often the case with other educational devices which are limited solely to educational purposes.

These together with other objects and advantages, which will become subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENT

Figure 1:
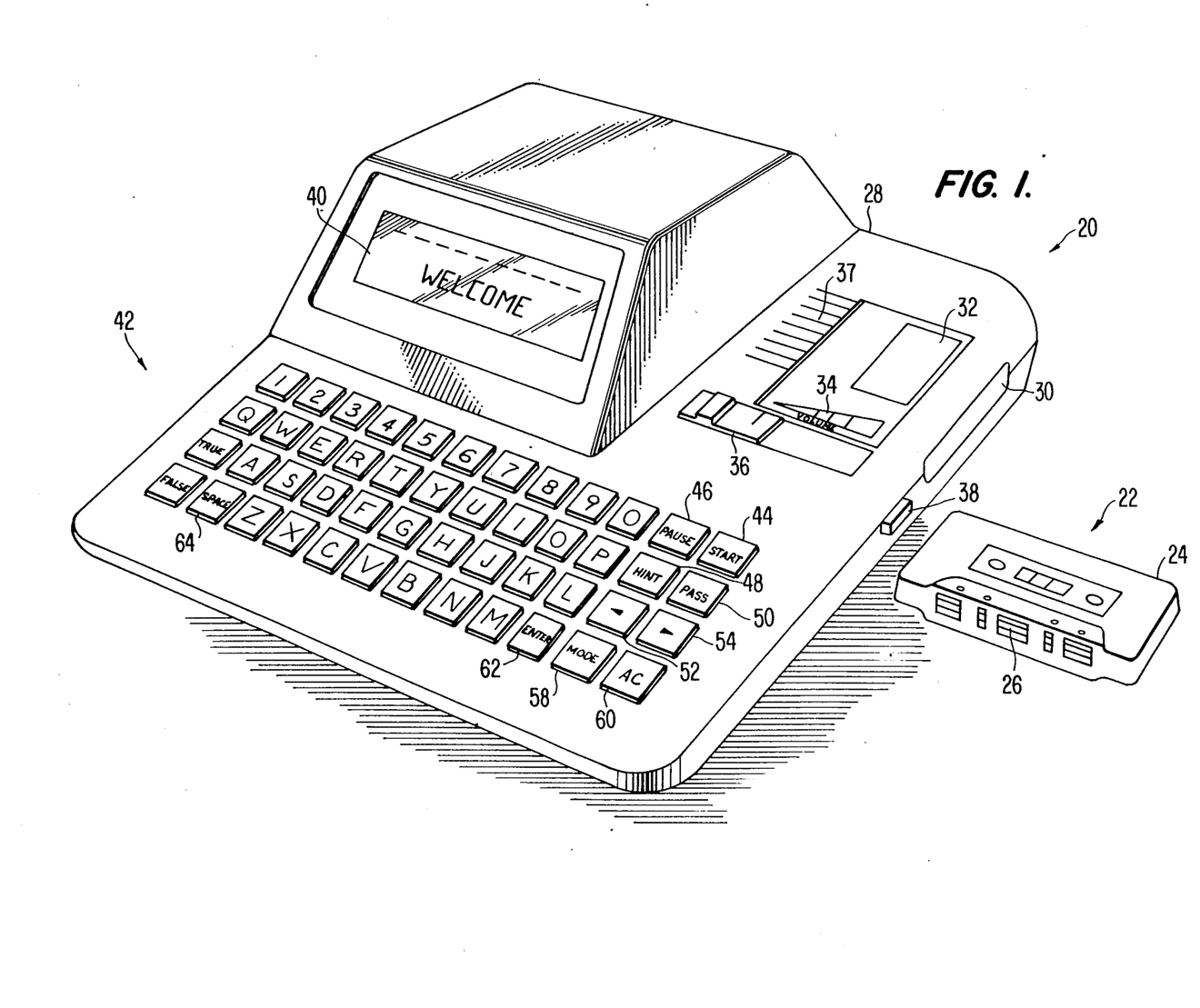
FIG. 1 is a perspective view of the preferred embodiment of the educational device of the present invention.

FIG. 1 is a perspective view of the preferred embodiment of an educational device in accordance with the present invention. This embodiment includes an educational device 20 which is adapted to receive a tape cassette 22 including a cassette housing 24 and magnetic tape 26 for storing voice signals and data signals. Alternatively, the tape cassette 22 can be a standard tape cassette storing music or any other type of audio material which can be played by a standard cassette player. The term voice signal is used herein to refer to any type of signal (music, speaking, electronic melody, etc) which can be stored on a tape used to reproduce an audio signal. The educational device 20 includes a housing 28 having a tape slot 30 provided therein for receiving the tape cassette 22. The housing 28 also has a window 32 through which the tape cassette 22 can be viewed, and a volume indicator 34 is positioned adjacent a slideable volume switch 36 for indicating the volume level of an audio signal generated by the educational device 20. The housing 28 also includes a grid 37 positioned adjacent an internal speaker. An eject/fast-forward button 38 extends from the housing 28 adjacent the tape slot 30 and is used either to cause the tape to be driven in a fast-forward operation or to eject the tape cassette 22 from the tape slot 30. A display 40 is visible through the housing 28 to display numbers and letters corresponding to keys actuated by the user and to display a variety of signals described below with respect to FIG. 2. In the preferred embodiment, the display 40 is a liquid crystal display.

Figure 2:
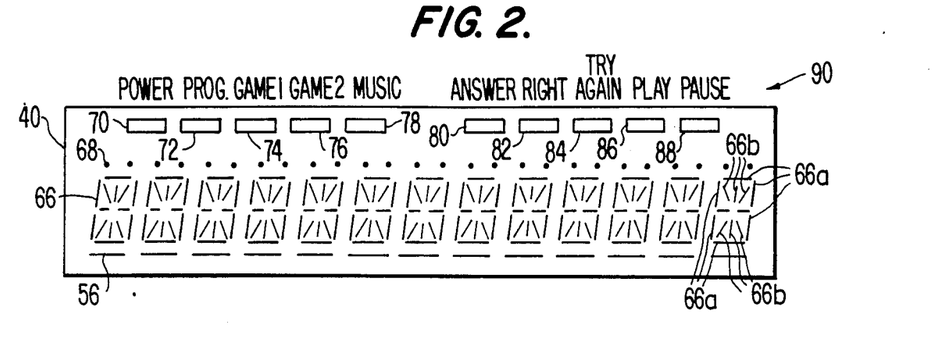
FIG. 2 is a front view of the display 40 of FIG. 1.

Also extending through the housing 28 of the educational device 20 is a user input means comprising a computer style keyboard 42 including a plurality of standard data keys, such as the letters of the alphabet and numerals 0 to 9. The keyboard arrangement of the data keys is the same as that for a standard typewriter or computer. The keyboard 42 also includes true and false keys for use when this type of answer must be supplied by the user in response to a question. A start key 44 is used to start the driving of the tape cassette 22 or to start an internal program stored in the educational device 20. A pause key 46 is used to stop the driving of the tape cassette 22 or to halt the internal game stored in the educational device 20. A hint key 48 can be used with the programmed tape cassette 22 to cause one letter or digit of an answer to appear on the display 40 each time this key is pressed. A user can employ the hint key 48 when he or she is unsure of the correct answer but would like to attempt to supply the answer after receiving only a partial answer. A pass key 50 can be actuated by the user to pass over the current question and proceed to the next question on the programmed tape cassette 22. Cursor move keys 52 and 54 can be actuated by the user to move a cursor 56 along the display 40 (FIG. 2). A mode key 58 is actuated by the user to change the mode of the educational device 20. In the preferred embodiment, the educational device 20 of the present invention has four modes including PROGRAM, GAME 1, GAME 2 and MUSIC. The PROGRAM mode is the mode which is used when a programmed tape cassette 22 is inserted in the tape slot 30 of the housing 28. When a standard music tape cassette 22 is to be inserted in the tape slot 30, the mode key should be actuated to switch the mode to MUSIC. Finally, the GAME 1 and GAME 2 modes can be used to play internal games stored in the educational device 20. When power is on and the mode has been switched to either the PROGRAM mode or the MUSIC mode words or sentences can be displayed by pressing the appropriate letters. Alternatively, music can be played by pressing the numeral keys 1-8 which correspond to the eight musical notes of a diatonic scale.

By repeatedly actuating the mode key 58, the user can sequence through the four modes until arriving at the desired mode for the educational device 20. An AC key 60 can be actuated by the user to clear the display 40, while an enter key 62 is used to enter an answer after the user has input all of the necessary answer data for responding to a question A space key 64 is actuated to indicate a blank space.

FIG. 2 is a front view showing the details of the display 40 of FIG. 1. In the preferred embodiment, the display 40 is a liquid crystal display (LCD) capable of displaying up to 13 characters 66 as they are input through the data keys of the keyboard 42. Each of the characters 66 includes outer segments 66a which are used to form an "0", and inner segments 66b which are formed inside of the outer segment 66a. All numerals and letters can be displayed using the segments 66a and 66b. Cursor segments 56 which are positioned beneath each character 66, allow the educational device to indicate the position of the next character in an answer. Segments 68 which are above the characters 66, can be used to form a German umlaut if required. In addition to these segments, there are a number of indicator segments located above the characters 66. A power indicator segment 70 provides a display when the power is on. A program indicator segment 72 is displayed when the educational device 20 is in the mode for playing back a programmed tape cassette 22. A game 1 indicator segment 74 or a GAME 2 indicator segment 76 generate a display when the educational device 20 is in the mode for one of the internal games stored within the educational device 20. A music indicator segment 78 generates a display when the educational device is in the mode for playing a standard (i.e., non-programmed) tape cassette 22. An answer indicator segment 80 is displayed during the PROGRAM mode when it is time for the user to enter answer data via the keyboard 42. A correct answer indicator segment 82 is displayed when the user has input a correct answer, while an incorrect answer indicator segment 84 is displayed when the user has input an incorrect answer. A play indicator segment 86 is displayed when the educational device 20 is in the PROGRAM mode or the MUSIC mode, and the tape cassette 22 is being driven. The play indicator segment 86 is extinguished when the tape cassette 22 is stopped to await the answer of the user, or when the tape reaches its end, or when the tape is being paused as a result of the pause key 46 being actuated by the user. A pause indicator segment 88 is displayed when the user actuates the pause key 46, or when the tape is stopped while awaiting the user's answer, or when the tape reaches its end, or when no tape cassette 22 is inserted in the tape slot 30 while the educational device 20 is in the PROGRAM mode or the MUSIC mode. Indicia 90 corresponding to the indicator segments 70, 72, 74, 76, 78, 80, 82, 84, 86 and 88, is provided on the housing 28 above the display 40.

Figure 3:
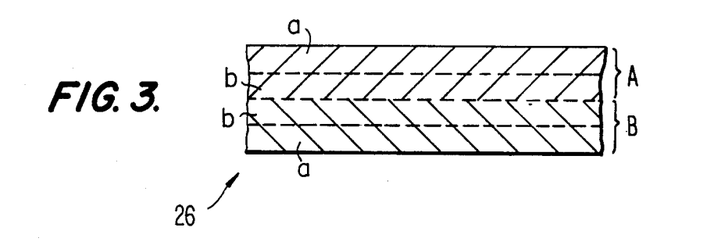
FIG. 3 is a side view of the tape 26 housed in the cassette of FIG. 1.

FIG. 3 is a side view of the magnetic tape 26 for describing the format of the tape 26. The tape 26 has two sides A and B, each of which is divided into a track a for voice signals and a track b for data signals, including the data for correct answers. The correct answer data is formatted in 8-bit words which begin with a start code and end with a stop code. It should be noted that the data signals included on the track b can also include display data for displaying characters representing a question on the display 40. For example, certain programmed tape cassettes 22 may include display data for displaying an equation for which the user is to input the solution.

Figure 4:
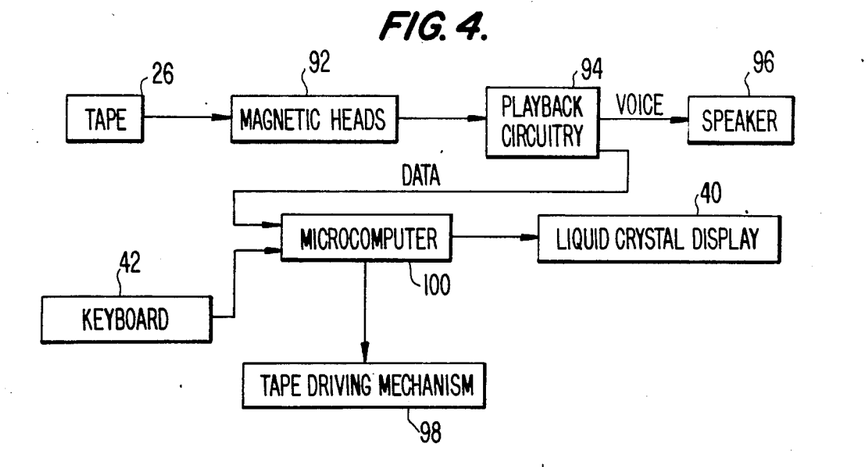
FIG. 4 is a block diagram of the electronic circuitry for controlling the operation of the educational device of FIG. 1.

FIG. 4 is a block diagram of the electronic circuitry of the educational device 20. Magnetic heads 92 are positioned to read each of the voice signals and data signals from the magnetic tape 26, and playback circuitry 94 provides a voice playback signal based on the voice signal and a data playback signal based on the data signal. A speaker 96 receives the voice playback signal and acts as a means for generating an audio signal based on the voice playback signal. The audio signal may include a question requiring a response from the user or may include additional audio material. In the MUSIC mode of operation of the educational device 20, the speaker 96, the playback circuitry 94 and the magnetic heads 92 will operate in the same manner as a standard cassette player to reproduce the audio material on the tape. A tape driving mechanism 98 acts as driving means for driving the magnetic tape 26, so that the tape 26 is transported past the magnetic heads 92. A microcomputer 100 is connected to the playback circuitry 94, the display 40, the keyboard 42 and the tape driving mechanism 98. The microcomputer 100 receives the data playback signal from the playback circuitry 94 and stores correct answer data. The microcomputer 100 also receives the answer data input by the user via the keyboard 42, as well as signals corresponding to the other keys (44, 46, 48, 50, 52, 54, 58, 60 and 62) actuated by the user. In the case of a programmed tape cassette 22 having display data included in the data playback signal, the microcomputer 100 generates a display signal to cause the specified portion of the question to be displayed on the display 40. Further, the microcomputer 100 controls the display 40 to display the answer data as it is being input by the user. The microcomputer 100 compares the answer data input by the user with the correct answer data included in the data playback signal to determine whether or not the answer data input by the user is correct. Depending upon the results of this comparison, the microcomputer 100 provides control signals to actuate the display 40 to display the correct answer indicator segment 82 or the incorrect answer indicator segment 84. When the user inputs incorrect answer data for a predetermined number of times, the microcomputer 100 will generate control signals to cause the display 40 to display the correct answer. The microcomputer 100 also generates tape drive control signals for controlling the tape driving mechanism 98. Further, the microcomputer 100 is also connected to the playback circuitry 94 to provide an audio control signal which causes an electronic melody, representing a correct answer or an incorrect answer, to be provided as an audio signal from the speaker 96. Finally, the microcomputer 100 stores the internal games for operation of the educational device 20 when it is in one of the internal game modes.

Figure 5:
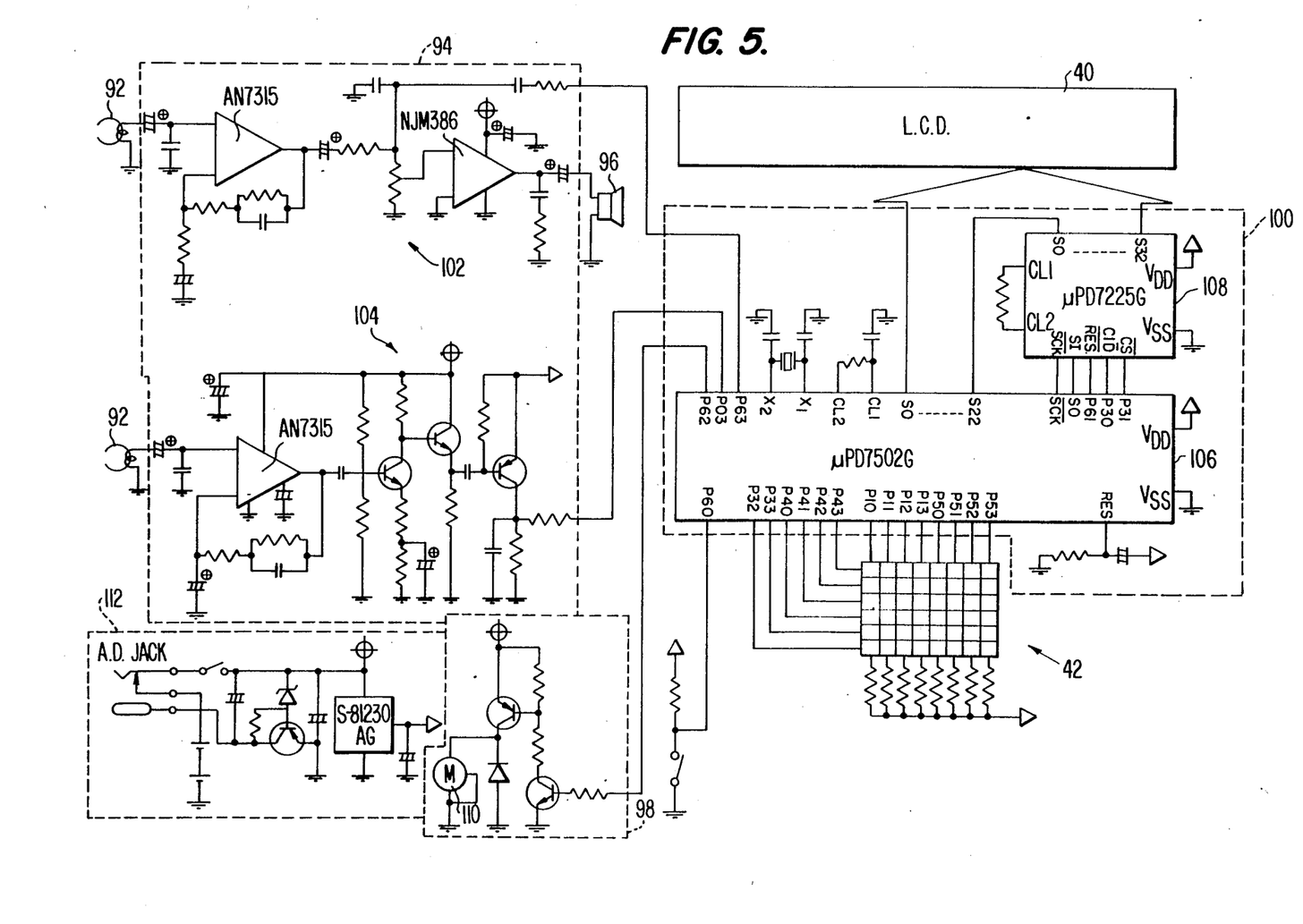
FIG. 5 is a circuit diagram corresponding to the block diagram of FIG. 4.

FIG. 5 is a circuit diagram corresponding to the block diagram of FIG. 4. As illustrated in FIG. 5, the magnetic tape heads 92 are connected to the playback circuitry 94 which includes a voice playback circuit 102 and a data playback circuit 104. The voice playback circuit 102 is connected to the speaker 96 to provide the voice playback signal to the speaker 96 which generates an audio signal. The data playback circuit 104 is connected to provide the data playback signal to the microcomputer 100 which includes a main microcomputer 106 and a display microcomputer 108, both of which are used to drive the display 40. The keyboard 42 is connected to provide input signals to the main microcomputer 106, and the main microcomputer 106 is connected to provide output signals to the voice playback circuit 102 (to cause the speaker 96 to generate, as an audio signal, an electronic melody indicating a correct answer or an incorrect answer) and to the tape drive mechanism 98 which includes a motor 110 for transporting the magnetic tape 26 past the magnetic heads 92. A power supply circuit 112 provides power for the educational device 20.

Figure 6:
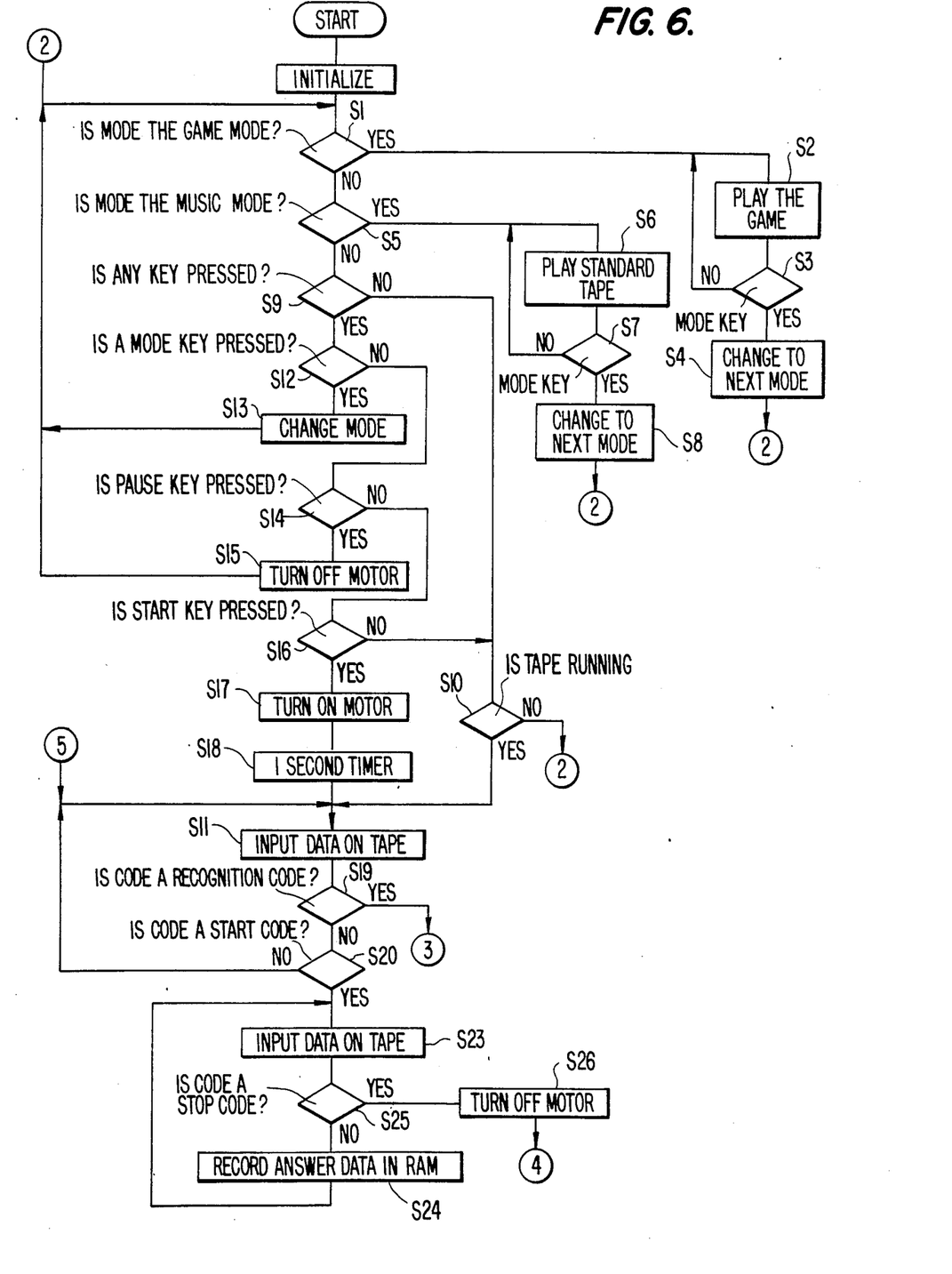
FIGS. 6 and 7 form a flowchart for describing the processing carried out by the microcomputer 100 of FIG. 4.
Figure 7:
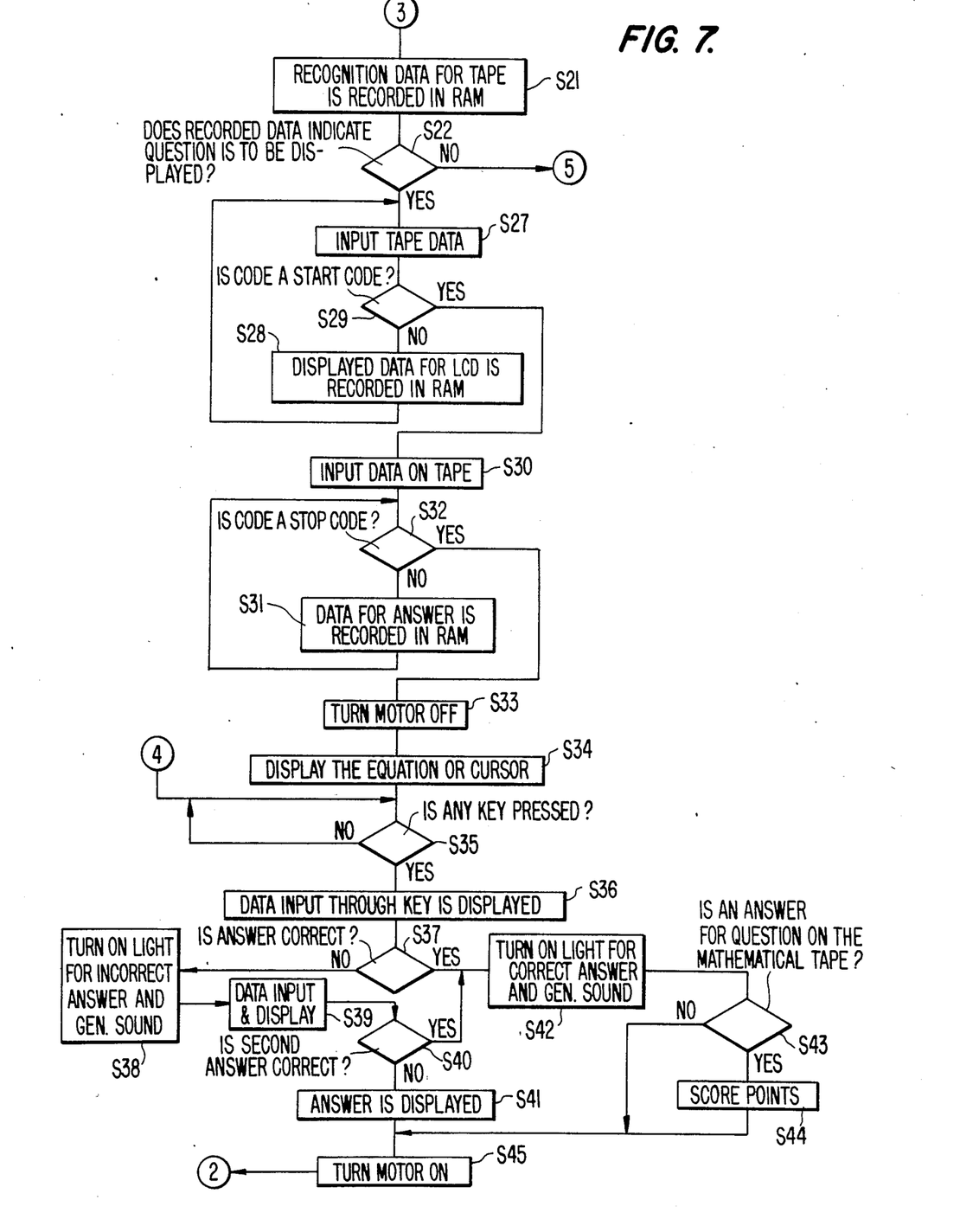

The operation of the preferred embodiment of the present invention will now be explained with reference to FIGS. 6 and 7 which form a flowchart for the processing performed by the microcomputer 100 of FIG. 5. After the power is turned on and the device 20 is initialized, it is determined whether the educational device 20 is in one of the internal game modes (S1) (FIG. 6). If the educational device 20 is in one of the internal game modes, the microcomputer 100 actuates the display 40 and receives data from the keyboard 42 to play out the particular game which is stored internally in the educational device 20 (S2). The microcomputer 100 determines whether the mode key 58 has been changed (S3) and as long as there is no mode change the educational device 20 remains in the game mode. However, once it is determined that the mode key 58 has been actuated, then the educational device is changed to the next mode (S4). One example of an internal game which could be stored in the educational device 20 is a quick pressing game in which a key corresponding to a character which appears on the left of the display 40 at random, must be pushed as quickly as possible in order to score points. In this game, the user is awarded points based on the speed with which the key corresponding to the displayed character, is actuated. Another example of an internal game is a game which involves sound. First, a single note is generated by the educational device 20 and the user must select the appropriate numeral key matching the sound. If the user is successful, the educational device 20 will then generate two sounds corresponding to two notes which must be matched by the user. The game continues with three sounds, four sounds, etc., depending on the success of the user.

If it is determined that the educational device 20 is not in the game mode (S1) then it is determined whether the device 20 is in the music mode (S5). If the device 20 is in the music mode, then a standard tape is played (S6) until the mode is changed (S7), at which time the educational device 20 is changed to the next mode (S8). If the educational device 20 is not in the music mode (S5) then it is determined whether any key is pressed (S9), and if not, it is determined whether the tape cassette 22 is running (S10). If the tape cassette 22 is not running, then processing is returned to determine the appropriate mode (S1, S5), while if the tape cassette 22 is determined to be running, processing proceeds to the step of inputting the data on the tape (S11). If it is determined that a key has been pressed (S9), it is then determined whether the mode key 58 was pressed (S12), and if so, the mode is changed accordingly (S13). If the mode key 58 has not been pressed, then it is next determined whether the pause key 46 has been pressed (S14). If the pause key 46 has been pressed, then the motor 110 of the tape driving mechanism 98 is turned off (S15). If the pause key 46 has not been pressed then it is determined whether the start key 44 has been pressed (S16), and if not, it is determined whether the tape is running (S10). If the start key 44 has been pressed then the tape motor 110 is turned on (S17) and one second is timed out (S18), after which data is input from the tape 22 (S11). After data has been input from the tape (S11) it is determined whether the input data is a recognition code (19) or a start code (S20). If the data is a recognition code, then the recognition data is stored in a RAM in the microcomputer 100 (S21) (FIG. 7) and it is determined whether the recorded data indicates that at least a portion of the question is to be displayed (S22). For example, in certain games it is desirable to display part of a word in a spelling or rhyming game, while in a mathematical program it may be desirable to display an equation for which a solution is to be provided by the user. If no part of the question is to be displayed, processing continues until it is determined that a start code has been input (S20), at which time data from the tape cassette 22 is input (S23) and recorded in the RAM (S24) until a stop code is detected (S25), at which time the motor 110 for driving the tape cassette 22 is turned off (S26).

If the recognition data indicates that a portion of the question is to be displayed (S22) then display data from the tape is input (S27) and the portion of the question to be displayed is recorded in the RAM (S28) until a start code is detected (S29) at which time data for the correct answer is input from the tape cassette 22 (S30). The data for the correct answer is input and recorded in the RAM (S31) until a stop code is detected (S32), at which time the motor 110 for driving the tape cassette 22 is turned off (S33) and the desired portion of the question (e.g., an equation or cursor) is displayed (S34).

After the motor 110 has been turned off (S26) or the desired portion of the question has been displayed (S34), it is determined whether any of the keys is pressed (S35). As the user inputs answer data through the keys, the answer data is displayed (S36), and the microcomputer 100 determines whether the answer is correct (S37). If the answer is not correct, the incorrect answer indicator segment 84 (FIG. 2) is displayed and an electronic melody indicating an incorrect answer is generated (S38). Then, the user is allowed to input new answer data which is again displayed on the display 40 (S39), after which the microcomputer 100 determines whether the second answer is correct (S40). If neither the first answer nor the second answer is correct, then the microcomputer 100 will automatically cause the display 40 to display the correct answer via the characters 66 (S41). If either the first answer or the second answer is correct then the microcomputer 100 will cause the display 40 to acutate the correct answer indicator segment 82, and an electronic melody indicating a correct answer is generated via the microcomputer 100, the voice playback circuitry 102 and the speaker 96 (S42). Next, it is determined whether the correct answer is for a question on a tape which generates a score (e.g., a mathematical tape) (S43). If so, the appropriate number of points are tabulated and displayed on the display 40 (S44), after which the tape drive motor 110 is turned on (S45), so that the educational device 20 can proceed to the next question.

Figure 8:
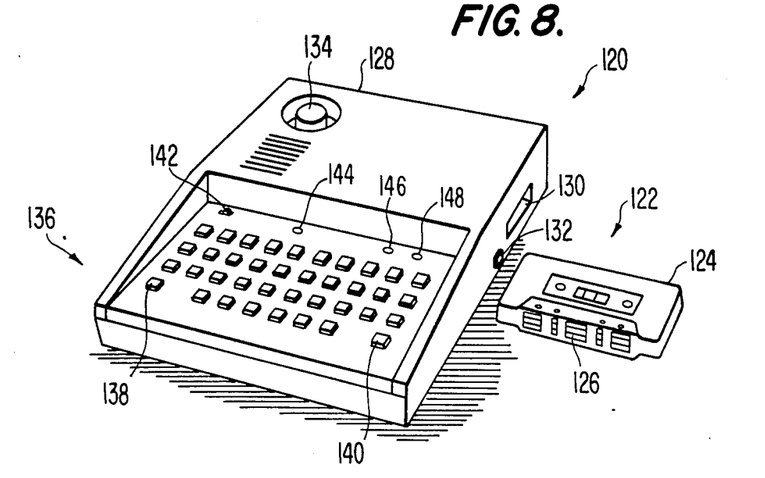
FIG. 8 is a perspective view of an alternate embodiment of the educational device of the present invention.

FIG. 8 is a perspective view of an alternate embodiment of the educational device of the present invention. The alternate embodiment is essentially a simplified version of the preferred embodiment described above with respect to FIGS. 1–7 in that it does not require a liquid crystal display 40 for displaying the answer data as it is input by the user. Further, the educational device of FIG. 8 includes only a PROGRAM mode and a MUSIC mode. However, the basic concept of an interactive educational device employing tape cassettes having voice signals and data signals stored thereon, is the same.

Referring to FIG. 8, an educational device 120 is adapted to receive a tape cassette 122 including a cassette housing 124 and a magnetic tape 126. The tape cassette 122 is essentially the same as the tape cassette 22 of the preferred embodiment, with the exception that the particular type of program stored on the tape cassette 122 must vary from the tape cassette 22 in view of the different functions performed. The format of the data on the tape 26 is the same as that described above for the tape cassette 22 with respect to FIG. 3. As with the tape cassette 22, the tape cassette 122 may be a standard tape cassette having various types of audio material stored thereon. The educational device 120 includes a housing 128 having a tape slot 130 therein for receiving the tape cassette 122. An eject/fast-forward button 132 extends from the housing 128 and may be used to drive the tape cassette 122 in a fast-forward operation or to eject the tape cassette 122 from the tape slot 130. A volume control knob 134 extends from the housing and is used to control the volume level at which the voice signals on the tape cassette 122 are played back.

A keyboard 136 acts as a user input means for inputting answer data and an enter signal to indicate that the input of answer data has been completed. The keyboard 136 includes a computer style arrangement of alphabetic and numerical keys, as well as true and false keys, an erase key 138 and an enter key 140. The erase key 138 is actuated by the user when it is desired to restart the input of answer data. Thus, the erase key 138 is similar to the clear key 60 which is provided in the embodiment of FIG. 1. The enter key 140 is pressed by the user after entry of the answer data has been completed. A mode switch 142 is used to set the mode of the educational device 120 in the PROGRAM mode in which a programmed tape cassette 122 is employed or the MUSIC mode in which audio material from a standard tape cassette 122 (e.g., music) is played back. The display means for the educational device 120 includes a power on light 144, a correct answer light 146 (e.g., green) and an incorrect answer light 148 (e.g. red). The power on light 144 indicates that a tape has been inserted and that the device 120 is on. In this embodiment, an integrated power switch automatically turns the educational device 120 on or off when a tape cassette 122 is inserted into or removed from the tape slot 130.

Figure 9:
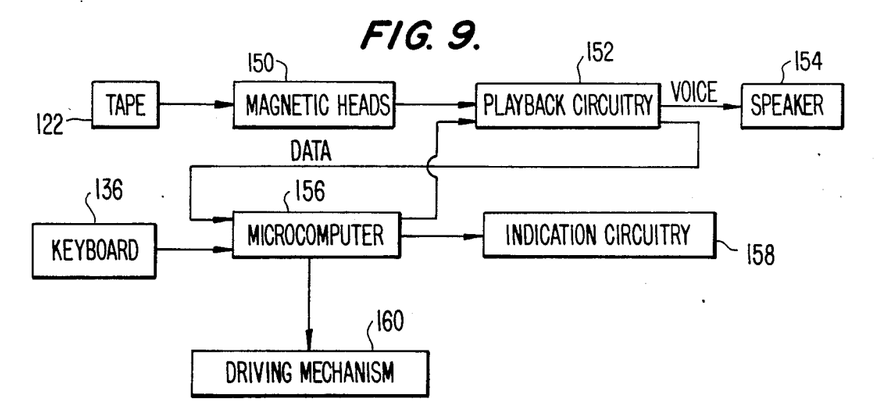
FIG. 9 is a block diagram of the electronic circuitry for controlling the operation of the educational device of FIG. 8.

FIG. 9 is a block diagram of the circuitry for performing the functions of the educational device 120. The tape cassette 122 is read by magnetic heads 150 which provide voice signals and data signals to playback circuitry 152. The playback circuitry 152 provides a voice playback signal to a speaker 154, and a data playback signal to a microcomputer 156. The microcomputer 156 is connected to the keyboard 136 to receive the answer data input by the user. The microcomputer 156 is also connected to indication circuitry 158 including the power on light 144, the correct answer light 146 and the incorrect answer light 148, so that the microcomputer 156 can actuate the appropriate lights in dependence upon the input data. Further, the microcomputer 156 provides a driving signal to a tape driving mechanism 160 for transporting the tape 126 past the magnetic heads 150 in dependence upon the data playback signal. The microcomputer 156 is also capable of providing an audio control signal to the playback circuitry 152 to cause the playback circuitry 152 to generate a signal to cause the speaker 154 to provide an audio signal indicating a correct answer, an incorrect answer, or that a key has been actuated.

Figure 10:
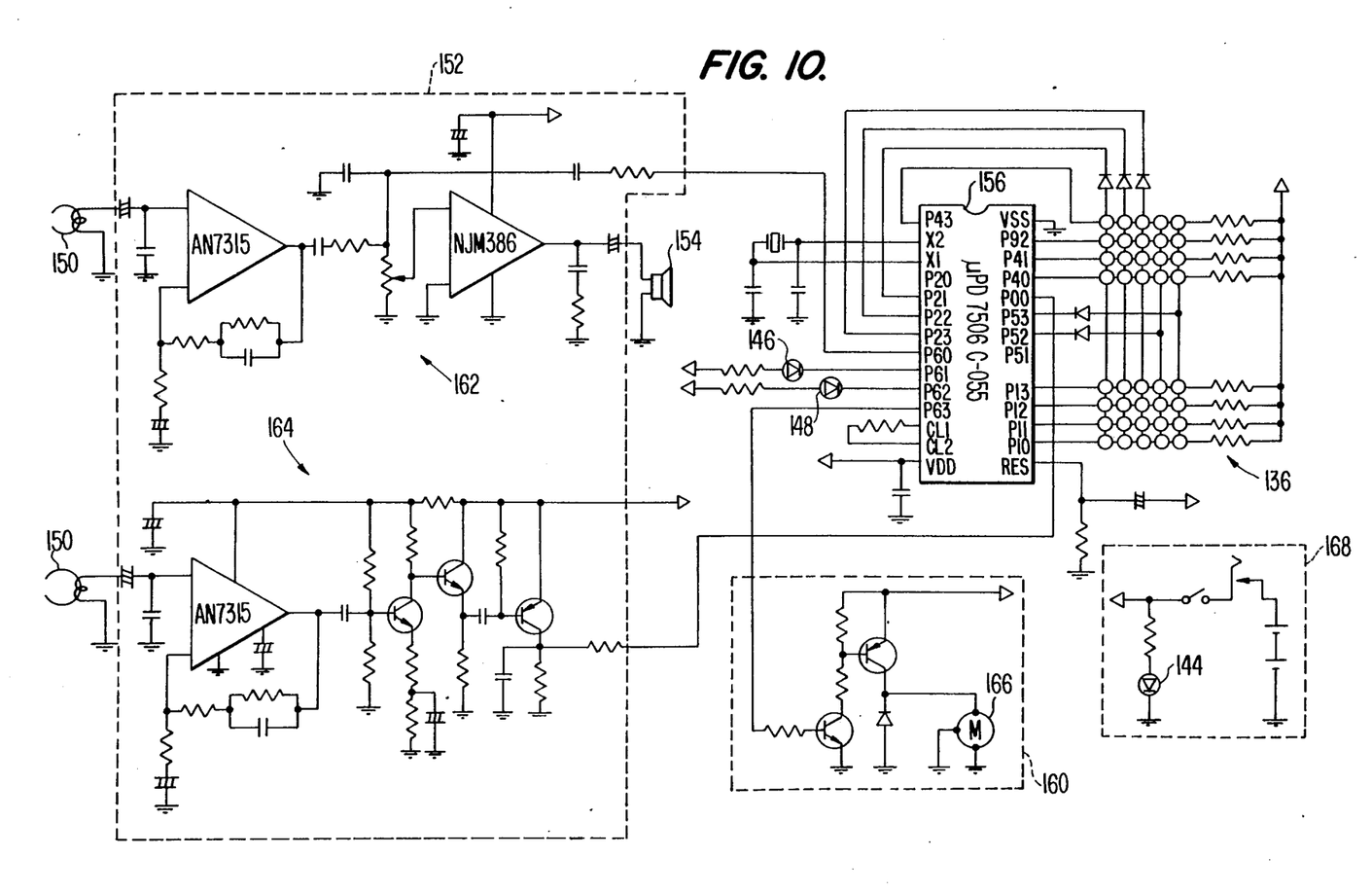
FIG. 10 is a circuit diagram corresponding to the block diagram of FIG. 9.

FIG. 10 is a circuit diagram corresponding to the block diagram of FIG. 9. Referring to FIG. 10, the magnetic heads 150 are connected to the playback circuitry 152 which includes a voice playback circuit 162 and a data playback circuit 164. The microcomputer 156 is connected to both the voice playback circuit 162 and the data playback circuit 164 as well as to the keyboard 136. Thus, the microcomputer 156 receives inputs from the keyboard 136 and the data playback circuit 164. The microcomputer 156 stores correct answer data from the data playback signal and compares the correct answer data with the answer data input by the user, to determine whether a correct answer has been input. The microcomputer 156 generates control signals to actuate the appropriate one of the indicator lights 146 and 148 based on whether the answer data input by the user is correct. In addition, the microcomputer 156 provides a control signal to the voice playback circuit 162 so as to cause the speaker 154 to generate, as the audio signal, an electronic melody indicating a correct answer, an incorrect answer, or that a key has been actuated. The microcomputer 156 also controls a motor 166 in the tape driving mechanism 160, so as to drive the tape 126 based on the data playback signal and the input of correct answer data by the user. In this embodiment, the indicator lights 146 and 148 are a green LED and a red LED, respectively. A power supply circuit 168 includes an AC to DC converter, and provides power for the educational device 120. The power supply circuit 168 includes an LED which acts as the power on light 144.

The operation of the educational device 120 of FIG. 8 will be described with reference to the flowchart formed by FIGS. 11-13 which describe the processing performed by the microcomputer 156.

Figure 11:
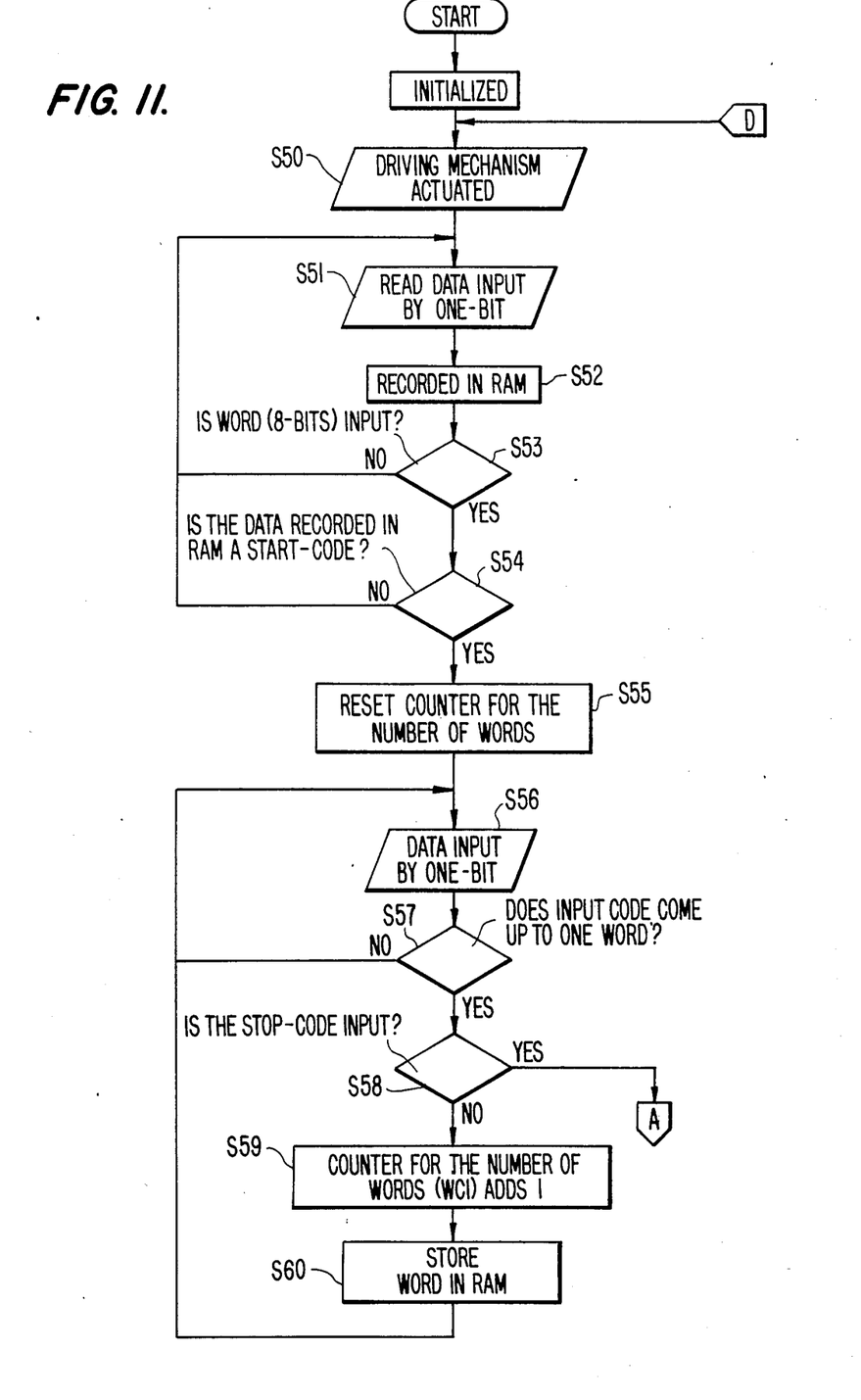
FIGS. 11-13 form a flowchart for describing the processing performed by the microcomputer 156 of FIG. 9.
Figure 12:
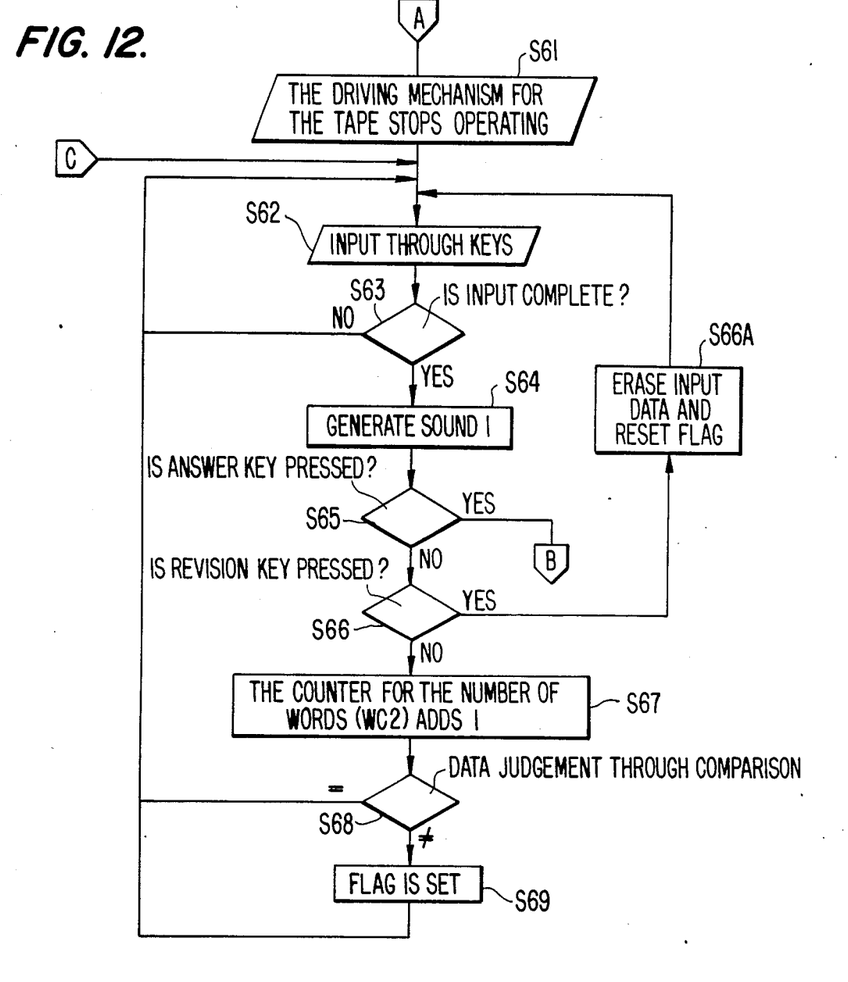

After the device 120 has been turned on (by inserting a tape cassette 122 into the tape slot 130) and initializes, the driving mechanism 160 is actuated to start to play the tape (S50) (FIG. 11). Input data is read in one bit at a time (S51) and is recorded in a RAM associated with the microcomputer 156 (S52), after which it is determined whether 8-bits (i.e., one word) have been input (S53). After one word has been input, the microcomputer 156 determines whether the data recorded in the RAM is a start code and steps S51-S54 are repeated until a start code is identified. Once the start code is input, a counter for the number of words is reset (S55) and data is again input one bit at a time (S56) until one word has been input (S57). When one word has been input, it is determined whether a stop code has been input (S58), and if not, the word counter is incremented by one (S59) and the word is stored in the RAM (S60), after which the steps S56, S57 and S58 are repeated until a stop code input is received. Once a stop code input is received the tape driving mechanism 160 is turned off (S61) (FIG. 12). As the tape has been running and the data for the correct answer has been stored in the RAM (S60) the magnetic head 150 connected to the voice playback circuit 162 has been providing voice signals to the voice playback circuit 162, so as to cause an audio signal to be generated by the speaker 154. This audio signal may represent, for example, a voice-presented question.

After the tape has been stopped (S61), the microcomputer 156 generates a control signal to cause an audio signal to be generated by the speaker 154 to indicate to the user that it is time to input answer data. Then, the user inputs answer data through the keyboard 136 (S62) and, upon the completed actuation of each key (S63) the microcomputer 156 generates an audio control signal to cause the speaker 154 to provide an audio signal indicating entry of key data (S64). Next, the microcomputer 156 determines whether the enter key 140 has been pressed (S65), and if not, the microcomputer 156 determines whether the erase key 138 has been pressed (S66). If the erase key 138 has been pressed, the microcomputer 156 will cause all previous input data to be erased and a flag to be reset (S66A) and the key input will start over (S62). If the erase key 138 has not been pressed, then the counter for the number of words is incremented by one (S67) and the microcomputer 156 determines whether the answer data input so far corresponds to the correct answer data received from the data playback circuit 164 (S68). If the answer data is thus far correct, processing is returned to allow input through the keyboard 136. If the input answer data is not correct then a flag is set (S69).

Figure 13:
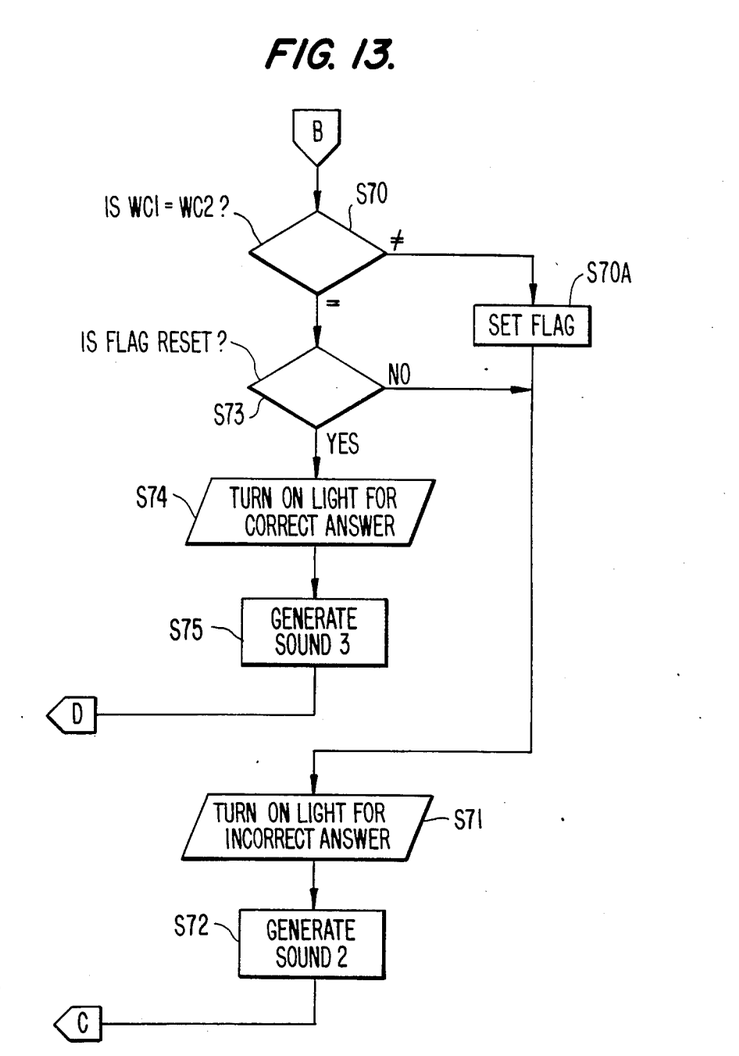

When the enter key 140 is finally pressed, the microcomputer 156 compares the counter numbers for the input answer data and the correct answer data (S70) (FIG. 13). If the numbers of the counters are the same, it is determined whether the flag is in the reset state (S73), and if so the microcomputer 156 provides a display control signal to turn on the correct answer light 146 (S74) as well as to generate an audio control signal to cause the speaker 154 to generate an audio signal indicating a correct answer (S75). If the numbers stored in the counters are not equal (S70) (in which case the flag is set (S70A)) or if the flag is not in the reset state (S73), the microcomputer 156 generates a display control signal to cause the incorrect answer light 148 to be turned on (S71), and generates an audio control signal to cause the speaker 154 to generate an audio signal indicating an incorrect answer (S72). If an incorrect answer is detected by the microcomputer 156, the tape driving mechanism 160 will not be actuated until a correct answer has been input. If a correct answer is detected by the microcomputer 156, processing returns to actuate the tape driving mechanism 160 (S50).

The educational device of the present invention may be implemented in numerous ways. For example, the display 40 need not be a liquid crystal display but could be, for example, an LED display, a CRT display, etc. In addition, although the educational device of the present invention is described as having only a single voice track and corresponding tape head, two voice tracks could be incorporated onto the tape in order to provide a stereo audio effect. Also, a headphone jack could be incorporated into the educational device. Further, the programming provided on the tape cassettes 22 and 122 can be of varied subject matter and used for a wide range of skill levels. For example, the educational device of the present invention may be used to teach children spelling, rhyming, mathematics, etc. Further, the subject matter of the program cassettes can be advanced to teach subjects such as history, geography, basic science, etc.

The educational device of the present invention has a number of advantages over prior art devices in that it is an interactive device which provides a child with immediate feedback concerning the accuracy of his or her answer. Further, the programmed tape cassette format including voice signals and data signals allows the programming to be quite flexible with respect to providing the child with an educational experience which is also entertaining. As a result of the plural mode features of the educational device of the present invention, the child is allowed to use the educational device not only for learning purposes, but also for entertainment purposes by switching the educational device into the MUSIC mode (for playing standard tape cassettes) or into the game mode for playing an internal game. Thus, the educational device of the present invention allows the child to learn basic skills independently, without the supervision of an adult, while at the same time providing the child with a device which can be used for entertainment as well. The flexibility of the device provides significant advantages in that the ratio of entertaining audio material to educational question material provided on the tape, can be varied in dependence upon the skill level of the children at which the programmed tape cassette is aimed. For example, with younger children it may be desirable to provide a relatively large amount of entertaining audio material in order to maintain their interest throughout the playing of the tape cassette. For older more advanced children, it may be desirable to provide a relatively larger amount of educational question audio material on the tape.

The many features and advantages of the invention are apparent from the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation shown and described and, accordingly, all suitable modifications and equivalents may be resorted to, falling within the scope of the invention.

What is claimed is:

1. An educational device adapted to receive a tape cassette having voice signals and data signals stored thereon, comprising:

driving means for driving the tape cassette;

reading means for reading the voice signals and data signals stored on the tape cassette, and for generating a voice playback signal and a data playback signal for each of the stored voice signals and data signals, respectively, the voice playback signal including a question and the data playback signal including data representing the correct answer to the corresponding question;

means for generating an audio signal, including the question, based on the voice playback signal;

user input means, actuated by a user, for inputting answer data in response to each of the questions, said user input means including means for inputting first, second or third mode signals indicating one of first, second and third modes of operation, the first mode being a mode in which the tape cassette has both voice signals and data signals stored thereon, the second mode being a mode in which the tape cassette includes only voice signals, so that the user can input the second mode signal when said educational device is to continuously play the tape cassette incuding only voice signals, and the third mode corresponding to an internal game stored in said educational device;

display means including means for displaying the answer data as it is input by the user through said user input means, and means for generating first or second display signals to indicate whether the input answer data is correct or incorrect; and control means for receiving the data playback signal, for controlling said driving means to drive the tape cassette in dependence upon the data playback signal, so that the tape cassette is temporarily halted to allow the user to input the answer data in response to the question included in the audio signal, for comparing the input answer data with the correct answer data included in the data playback signal, for generating a first control signal if the input answer data is correct and for generating a second control signal if the input answer data is incorrect, said display means generating one of the first and second display signals in dependence upon whether said control means generates the first control signal or the second control signal, said control means including:

means for storing data corresponding to the internal game, said control means generating internal game display control signals or internal game audio control signals in accordance with the data corresponding to the internal game, said display means generating a display in response to the internal game display control signals, said means for generating an audio signal generating audio signals in response to the internal game audio control signals, said control means judging the input answer data input by the user via said user input means in response to the display generated by said display means or the audio signal generated by said means for generating an audio signal, and said control means causing said display means to generate a score based on the answer data input by the user.

2. An educational device as set forth in claim 1, wherein:

when said control means generates the second control signal to indicate that the input answer data is incorrect, the user is allowed to input new input answer data via said user input means;

said control means automatically generates a correct answer display signal which is provided to said display means after the user has input answer data which is incorrect for a predetermined number of times; and said display means generates a display of the correct answer upon receiving the correct answer display signal from said control means.

3. An educational device as set forth in claim 1, wherein:

the data playback signal includes question display data;

said control means receives said question display data and provides a question display signal; and said display means generates a question display corresponding to the question display data in response to the question display signal, after which, the user can input answer data in response to the question display, via said user input means.

4. An educational device as set forth in claim 3, wherein:

said means for displaying the answer data comprises a liquid crystal display;

said means for generating first and second display signals comprises a correct answer display and as incorrect answer display, respectively;

said display means further includes:

a power indicator for indicating that power for said educational device is turned on;

a mode indicator for indicating the mode of said educational device;

a pause indicator for indicating when the tape cassette is not being driven by said driving means;

an answer indicator for indicating when the user is to input the answer data in response to one of the questions.

5. An educational device as set forth in claim 4, wherein:

said user input means comprises a keyboard, including:

an enter key for inputting an enter signal when the user has completed input of the answer data;

a start key for inputting a start signal to cause said control means to actuate said driving means;

a pause key for inputting a pause signal to cause said control means to temporarily stop said driving means;

a hint key for inputting a hint signal to cause said control means to generate a hint display signal so that said display means displays a portion of the correct answer;

a pass key for inputting a pass signal to cause said control means to actuate said driving means to proceed to the next voice signal and corresponding data signal stored on the tape cassette; and a clear key for inputting a clear signal to cause said control means to clear said display means.

6. An educational device as set forth in claim 4, wherein said liquid crystal display includes a cursor for indicating the next position for which the input answer data is to be displayed.

7. An educational device as set forth in claim 4, wherein said control means comprises a microcomputer.

8. An educational device as set forth in claim 7, wherein said means for generating an audio signal comprises a speaker.

9. An educational device as set forth in claim 7, wherein said reading means comprises:

a first magnetic head positioned to read the voice signals stored on the tape cassette;

a first playback circuit, coupled to said first magnetic head and said speaker, for providing the voice playback signal to said speaker;

a second magnetic head positioned to read the data signals stored on the tape cassette; and a second playback circuit, coupled to said second magnetic head and said microcomputer, for providing the data playback signal to said microcomputer.

10. An educational device as set forth in claim 9, wherein:

said first playback circuit is coupled to said microcomputer;

said microcomputer generates a first audio control signal if the input answer data input by the user is correct, and generates a second audio control signal if the input answer data is incorrect; and said first playback circuit provides an indicator Signal to cause said speaker to generate, as an audio signal, a first electronic melody or a second electronic melody in dependence upon whether said microcomputer has generated the first audio control signal or the second audio control signal.

11. An educational device as set forth in claim 10, further comprising a housing for holding said driving means, said reading means, said means for generating an audio signal, said user input means, said display means and said control means, said housing including a slot through which the tape cassette can be inserted.

12. An educational device as set forth in claim 11, further comprising a button extending from said housing, said button having a first position for causing said driving means to drive the tape cassette in a fast-forward operation, said button having a second position for causing said driving means to eject the tape cassette from the slot in said housing.

* * * * *